(12) United States Patent
Devadhar et al.

(10) Patent No.: US 8,875,152 B2
(45) Date of Patent: Oct. 28, 2014

(54) SYSTEM, METHOD AND COMPUTER PROGRAM PRODUCT FOR DYNAMICALLY INCREASING RESOURCES UTILIZED FOR PROCESSING TASKS

(75) Inventors: Vijayanth Devadhar, Fremont, CA (US); Kevin Oliver, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 705 days.

(21) Appl. No.: 13/092,077

(22) Filed: Apr. 21, 2011

(65) Prior Publication Data

US 2011/0265088 A1 Oct. 27, 2011

Related U.S. Application Data

(60) Provisional application No. 61/327,042, filed on Apr. 22, 2010.

(51) Int. Cl.
*G06F 9/46* (2006.01)
*G06F 9/50* (2006.01)
*H04L 29/08* (2006.01)

(52) U.S. Cl.
CPC ............. *G06F 9/505* (2013.01); *G06F 9/5083* (2013.01); *H04L 67/1017* (2013.01); *H04L 67/02* (2013.01)
USPC ........................................................ 718/105

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |

(Continued)

OTHER PUBLICATIONS

Dynamic Service Provisioning Using GRIA SLAs Mike Boniface, Stephen C. Phillips, Alfonso Sanchez-Macian, and Mike Surridge Published: Feb. 2009 Publicly available: 2007.*

(Continued)

*Primary Examiner* — Emerson Puente
*Assistant Examiner* — Paul Mills
(74) *Attorney, Agent, or Firm* — Zilka-Kotab, PC

(57) ABSTRACT

Mechanisms and methods are provided for dynamically increasing resources utilized for processing tasks. These mechanisms and methods for dynamically increasing resources utilized for processing tasks can enable embodiments to adjust processing power utilized for task processing. Further, adjusting processing power can ensure that quality of service goals set for processing tasks are achieved.

19 Claims, 6 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0034855 A1* | 2/2004 | Deily et al. ............... 718/102 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0260748 A1* | 12/2004 | Springer et al. ............ 709/200 |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |
| 2008/0244600 A1* | 10/2008 | Wong et al. ............... 718/104 |
| 2008/0249972 A1 | 10/2008 | Dillon |
| 2009/0063415 A1 | 3/2009 | Chatfield et al. |

OTHER PUBLICATIONS

Adaptive Mechanisms for Managing the High Performance Web-based Applications Ying Jiang, Dan Meng, Jianfeng Zhan, Danjun Liu Published: 2005.*

CoSAC: Coordinated Session-based Admission Control for Multi-tier Internet Applications Sireesha Muppala and Xiaobo Zhou Published: Aug. 2009.*

A Database-Centric Virtual Chemistry System Peter Lind and Markus Alm Published: 2006.*

Key Features of Oracle AQ Published: Dec. 18, 2002.*

A Dynamic Provisioning Framework for Multi-tier Internet Applications in Virtualized Data Center Yi Jin, Xu Liu, Jianfeng Zhan, Shuang Gao Published: 2008.*

U.S. Appl. No. 60/828,192, filed Oct. 4, 2006.

U.S. Appl. No. 12/887,456, filed Sep. 21, 2010.

* cited by examiner

SYSTEM, METHOD AND COMPUTER PROGRAM PRODUCT FOR DYNAMICALLY INCREASING RESOURCES UTILIZED FOR PROCESSING TASKS

CLAIM OF PRIORITY

This application claims the benefit of U.S. Provisional Patent Application 61/327,042 entitled "METHODS AND SYSTEMS FOR CONTROLLING THROUGHPUT IN AN ON-DEMAND SERVICE ENVIRONMENT," by Devadhar et al., filed Apr. 22, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to task processing in an on-demand services environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Traditionally, tasks queued for processing in an on-demand services environment have been processed using a predetermined number of threads dedicated to processing such queued tasks. In some circumstances, the predetermined number of threads is divided amongst different types of tasks, such that for each task type a different set of the threads is made available for processing tasks of that type. Unfortunately, various limitations are associated with rigidly predetermining the number of threads to be utilized for task processing.

For example, the number of threads to be utilized for task processing has traditionally been arbitrarily determined (e.g. by a developer, etc.). Thus, there has been an inability to ensure that the predetermined number of threads is sufficient for processing tasks in a manner which meets quality of service (QOS) goals set for such task processing. In particular, the number of threads has generally been determined without respect to behavior of the various task types, historical volume measured for incoming tasks types, processing efficiency with respect to the tasks, etc.

Accordingly, it is desirable to provide techniques enabling dynamic resource allocation to task processing performed by the database system, to improve efficiency of the database system.

BRIEF SUMMARY

In accordance with embodiments, there are provided mechanisms and methods for dynamically increasing resources utilized for processing tasks. These mechanisms and methods for dynamically increasing resources utilized for processing tasks can enable embodiments to adjust processing power utilized for task processing. The ability of embodiments to adjust processing power can ensure that quality of service goals set for processing tasks are achieved.

In an embodiment and by way of example, a method for dynamically increasing resources utilized for processing tasks is provided. In use, an unprocessed task is identified in a queue of a multi-tenant on-demand database system, the unprocessed task stored in the queue for processing by a server. Additionally, it is determined whether a quality of service policy associated with processing the unprocessed task has been violated. Further, an additional server is added for processing the unprocessed task, based on the determination.

While one or more implementations and techniques are described with reference to an embodiment in which dynamically increasing resources utilized for processing tasks is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for dynamically increasing resources utilized for processing tasks.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing dynamically increasing resources utilized for processing tasks will be described with reference to example embodiments.

Figure 1:
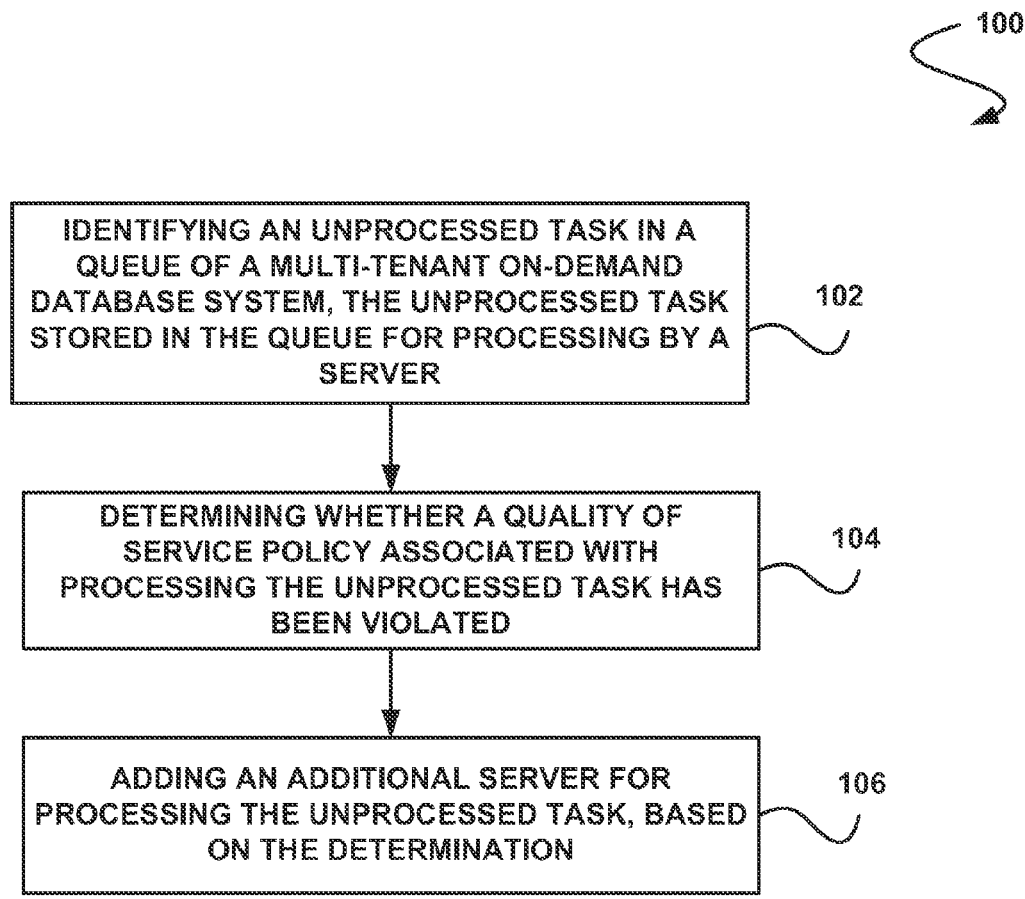
FIG. 1 illustrates a method for dynamically increasing resources utilized for processing tasks, in accordance with one embodiment.

FIG. 1 illustrates a method 100 for dynamically increasing resources utilized for processing tasks, in accordance with one embodiment. As shown in operation 102, an unprocessed task is identified in a queue of a multi-tenant on-demand database system, the unprocessed task stored in the queue for processing by a server. With respect to the present description, the multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

To this end, the queue of the multi-tenant on-demand database system may include any data structure queuing unprocessed tasks to be processed by a server provided in the multi-tenant on-demand database system. As an option, the server may be predetermined for usage (e.g. allowed to be used) in processing the unprocessed tasks stored in the queue. For example, the server may include a server of the multi-tenant on-demand database system which is registered for use in processing unprocessed tasks stored in the queue.

In one embodiment, the queue may store the unprocessed tasks in an order whereby tasks in the queue are individually selected from the queue in the order for processing. As an option, such order may include a top to bottom order. Thus, the unprocessed task identified in the queue may include the first (e.g. top) unprocessed task stored in the queue or any other unprocessed task stored in the queue.

In another embodiment, the queue may include a table and the unprocessed task may be stored in a row of the table. With respect to such embodiment, the unprocessed task may be identified by reading a row (e.g. a first row) of the table. Just by way of example, the present method 100 may be performed for each unprocessed task stored in the queue.

Further, it should be noted that the unprocessed task may include any task (e.g. job, unit or work, etc.) that is to be performed by one of the aforementioned server. Just by way of example, the unprocessed task may include deleting content (e.g. a file in a file system, etc.), creating a rule allowing access to content, recalculating content access rules based on groups provided access to the content and members of such groups, etc.

Additionally, as shown in operation 104, it is determined whether a quality of service (QOS) policy associated with processing the unprocessed task has been violated. Thus, in the present operation, the QOS policy associated with processing the unprocessed task may be identified for determining whether the same has been violated. It should be noted that the QOS policy may be identified in any manner that is based on the unprocessed task.

For example, in one embodiment, the QOS policy may be specific to a type (e.g. category, etc.) of the unprocessed task, such as a function associated with the unprocessed task (e.g. read, write, delete, recalculate, etc.). Optionally, different QOS policies may be predetermined for each of a plurality of different types of unprocessed tasks. To this end, with respect to the aforementioned embodiment, identifying the unprocessed task includes identifying a type of the unprocessed task, such that the QOS policy predetermined for such type may be identified.

In another embodiment, the QOS policy may be specific to the particular unprocessed task. Moreover, the QOS policy may include any standard (e.g. rule, etc.) according to which the unprocessed task is to be processed. Further, such QOS policy may be configured by an administrator, as an option.

Just by way of example, the QOS policy may indicate an amount of time, upon storage in the queue, in which the unprocessed task is to be processed. Accordingly, it may be determined that the QOS policy has been violated in response to a determination that the unprocessed task has been stored in the queue for more than the amount of time indicated the QOS policy. Still yet, it may be determined that the QOS policy has not been violated in response to a determination that the unprocessed task has been stored in the queue for less than the amount of time indicated by the QOS policy.

Further, as shown in operation 106, an additional server is added for processing the unprocessed task, based on the determination. In one embodiment, the additional server may be added in response to a determination that the QOS goal has been violated. Similarly, the additional server may not necessarily be added in response to a determination that the QOS goal has not been violated.

For example, when the QOS is not met for the unprocessed task (e.g. due to unavailability of the servers in the net of servers for processing the unprocessed task, etc.), the additional server may be added for use in processing (e.g. performing, executing, etc.) the unprocessed task. To this end, the additional server may include any server (e.g. of the multi-tenant on-demand database service) which is separate from the aforementioned server already registered for processing the unprocessed task at the time when the unprocessed task is identified.

As an option, adding the additional server may include registering the additional server as a server allowed to process the unprocessed task. In another embodiment, the additional server may be added by requesting that the additional server be added for processing the unprocessed task. Of course, it should be noted that the additional server may be added in any manner that allows the additional server to process the unprocessed task.

To this end, the method 100 may operate efficiently at a steady state for all tasks stored in the queue to process such tasks according to the QOS policies associated therewith. For example, additional processing power by way of additional servers may automatically be provided to process tasks for which their QOS policies have been violated (e.g. without manual input), thereby dynamically providing the amount of resources necessary to process a task. This may further eliminate an arbitrary static allotment by a developer of an amount of processing resources to be applied to process the tasks.

Figure 2:
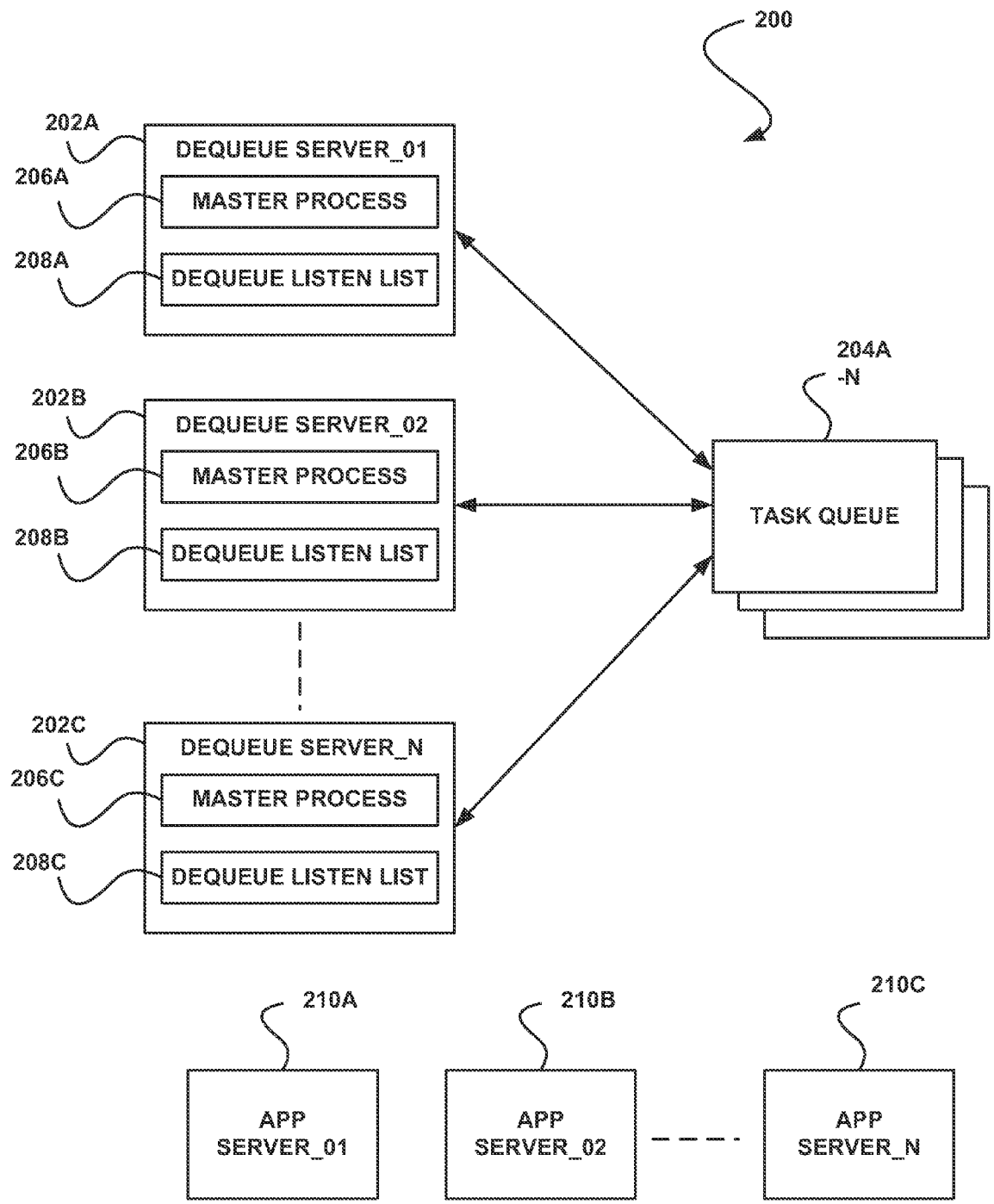
FIG. 2 illustrates a system for dynamically increasing resources utilized for processing tasks, in accordance with another embodiment.

FIG. 2 illustrates a system 200 for dynamically increasing resources utilized for processing tasks, in accordance with another embodiment. As an option, the system 200 may be implemented in the context of the architecture and environment of FIG. 1. Of course, however, the system 200 may be implemented in any desired environment.

As shown, a plurality of dequeue servers 202A-C are in communication with a plurality of task queues 204A-N. In the present embodiment, the dequeue servers 202A-C include a set of servers registered for processing unprocessed tasks stored in the task queues 204A-N. Optionally, the task queues 204A-N may include tables of a database shared by the dequeue servers 202A-C. Such tables may be distributed across a plurality of nodes (e.g. computers), as described below.

QOS policy for the task type is achieved again, the master process 206A-C may take action to reverse the action taken (e.g. by de-registering the registered application server 210A-N). The other server may be registered to process tasks of the task type utilizing a booster permit, as described below. As a given task type has its QOS policy violated in greater amounts, the master process 206A-C may have additional servers registered for processing tasks of the task type.

When a master process 206A-C recognizes that a QOS policy for a task type is being violated for a particular node, the master process 206A-C may release a booster permit for consumption. The booster permit may be released by storing the same in a booster permit table. Table 1 shows one example of a definition of a booster permit which may be stored in the booster permit table. Of course, it should be noted that that booster permit definition is set forth for illustrative purposes only, and thus should not be construed as limiting in any manner.

TABLE 1

```
BASS.BOOSTER_PERMIT (
    booster_permit_id   CHAR(15 BYTE) NOT NULL,
    rac_node            NUMBER NOT NULL,
    status              CHAR(1) NOT NULL,    -- This will be an enum with values
such as "Claimed", "Unclaimed"
    qos_weighting       NUMBER NOT NULL,     -- See section 5 "Booster Permit
Weighting"
    consumer_name       VARCHAR2 (30 BYTE) NOT NULL,   -- Contains what
message type this permit is tied to
    created_date        DATE NOT NULL,       -- Will allow us to track how long a
permit has sat in the "Unclaimed" status, see section 7 "Elastic dequeue
servers"
    expiration_date     DATE NOT NULL,
    owner               CHAR(15) -- FK app server id for the app server who
has claimed the permit
)
CREATE UNIQUE INDEX bass.pkbooster_permit ON
bass.booster_permit(booster_permit_id);
CREATE INDEX bass.ie1booster_permit ON bass.booster_permit(rac_node, status,
qos_weighting);
CREATE INDEX bass.ie2booster_permit ON bass.booster_permit(rac_node, owner,
consumer_name);
```

Also included are a plurality of application servers 210A-N which are not registered for processing tasks in the task queues 204A-N (e.g. but which are capable of processing the queued tasks once registered). In the present embodiment, the dequeue servers 202A-C, application servers 210A-N, and task queues 204A-N may each include components of a multi-tenant on-demand database service.

As also shown, each of the dequeue servers 202A-C includes a master process 206A-C. The master process 206A-C may monitor the unprocessed tasks stored in the task queues 204A-N for determining whether the QOS policies for such unprocessed tasks have been violated. In the present embodiment, the master process 206A-C may determine whether the QOS policy for each type of unprocessed task has been violated with respect to any of the unprocessed tasks stored in the task queues 204A-N.

When a particular task type on a particular node [e.g. Oracle™ real application clusters (RAC) node] is in violation of its QOS policy, the master process 206A-C may take action to resolve the violation by registering another server (e.g. dequeue server 202A-C or one of the application servers 210A-N) to process tasks of the task type. Thus, where the other server that is registered is an application server 210A-N, such registered application server 210A-N may become a member of the set of dequeue servers 202A-C). When the Before the master process 206A-C releases a booster permit, the master process 206A-C may first determine if the necessary service resources (e.g. database, central processing unit, etc.) are available. Such determination may be made based on a current level of resource utilization. One example of a technique for determining whether the necessary service resources are available is described in U.S. patent application Ser. No. 12/887,456, filed Sep. 21, 2010 and entitled "System, Method And Computer Program Product For Processing A Task Based On A System Utilization And Task Specific Resource Utilization" by Devadhar et al., which is herein incorporated by reference in its entirety.

In another embodiment, the determination may be made by comparing current resource availability against the utilization behavior of the specific task type. For example, task specific resource utilization data may be utilized for determining whether to release a booster permit. For example, it may be determined whether a given task type actually uses a resource (and by how much) when considering that resource's monitor. For example, if a file system's task type never touches the database, then checking the database central processing unit monitor may be avoided when considering whether to add a booster permit. Conversely, if the database is under duress, the task types that are the top consumers of the database central processing unit may be identified and demerits (described below) may be released just for those task types until the database is healthy again. This approach may more nimbly and accurately spin down or up activity for specific task types by considering their actual resource usage versus a resource's current utilization level.

Once a booster permit is released for a specific task type and node, the booster permit may be free to be acquired by any of the other servers (e.g. dequeue servers 202A-C or application servers 210A-C) that have not yet acquired a booster permit for the node with which the booster permit is associated. Note that a given booster permit may optionally only be acquired by a single server, such that the master process 206A-C may be responsible for releasing additional booster permits for a given node/task type combination. For example, the additional booster permits may be released when the acquisition of a single released booster permit still does not allow the QOS policy to be met (e.g. such that more processing is needed by other servers).

The servers may periodically (e.g. once a minute, etc.) check the booster permit table to see if there is booster permit available for a node for which it currently does not already own (i.e. has not acquired) a booster permit. When a booster permit is acquired by a server, it modifies its behavior to favor dequeuing from the task queues 204A-N tasks of the type associated with the booster permit. In one embodiment, the behavior may be modified by artificially selecting one of the first three positions in a listen list 208A-C of the server with the task type associated with the booster permit, with the rest of the listen list 208A-C being generated randomly.

Such listen list 208A-C may be utilized to obtain a task from the task queues 204A-N. With respect to such listen list 208A-C, tasks of a certain type may optionally only be dequeued from the task queues 204A-N if they are in the constructed listen list 208A-C. The listen list 208A-C may have the format {M1, M2, M3}, where M1, M2, M3 are different task types, and in this example a dequeue attempt may only look for task types 1-3, and type 1 may be given the first attempt for dequeue, if type 1 isn't found then type 2 may be attempted, and so on. Further, the listen list listen list 208A-C may be constructed on the fly for every dequeue attempt, and the listen list listen list 208A-C may consist of all task types with their listen listed position selected at random.

As noted above, the booster permit may be tied to both a task type and node, so the booster permit may optionally only modify the listen list listen list 208A-C of the server for the specific node associated with the booster permit. Thus, for example, where each of the dequeue servers 202A-C have four nodes, the dequeue server may own up to four booster permits, namely one booster permit per node.

When the master process 206A-C determines that a previously violated QOS policy for a given task type and node is being met again, the master process 206A-C may revoke (e.g. delete) the booster permit from the booster permit table. Consequently, the dequeue server 202A-C may executes a periodic process to look for newly released (e.g. released but unacquired) booster permits in order to validate that any existing booster permits it owns are still valid. If the booster permit has been removed by the master process 206A-C, the dequeue server 202A-C may throw away that booster permit internally and return to its normal listen list generation procedure (e.g. all task types positioned in the listen list randomly).

As noted above, as a given task type has its QOS policy violated in greater amounts, the master process 206A-C may have additional servers registered for processing tasks of the task type. This may be achieved by the master process 206A-C generating additional booster permits for that message type and node (e.g. such that it may be possible to have multiple booster permits outstanding for a given node and message type combination, and only when the QOS policy violations are reduced may these booster permits be removed).

As an option, where different task types have their associated QOS policies violated at the same time, a weighting value may be provided for each released booster permit. The weighting value may be increased as the QOS policy for a particular task types is more grossly violated than a QOS policy for another task type. The master process 206A-C may be responsible for providing such weighting value when the booster permit is released and periodically (e.g. once a minute) updating the weighting value on existing booster permits. As an option, the weighting value for a booster permit associated with a particular task type may be determined based on the current extent to which the QOS policy of the task type is being violated.

Furthermore, if a dequeue server 206A-C currently holds a booster permit of a lesser weighting value than a booster permit that is waiting to be acquired, then during the dequeue server's 206A-C regular booster table check the dequeue server 206A-C may swap booster permits, thereby acquiring the higher weighted booster permit and releasing a lesser weighted booster permit for another application server 210A-C to acquire. In addition, when server is looking to acquire a booster permit it may select a higher weighted booster permit before a lesser weighted booster permit.

As another option, once server has first acquired a booster permit, and therefore is registered to process tasks of the type associated with the booster permit, the newly registered dequeue server 202A-C may consult all resource utilization data to see if it can act on that booster permit. For example, it may consult local data (e.g. its memory) and remote data (e.g. database central processing unit, etc.). If it determines that it cannot act on the booster permit due to resources being under duress, than it may release the booster permit to be acquired at a later time (e.g. if it is remote resource related) or for a healthier server to take up (if it is a local issue). Thus, the burden of considering resource availability may be made at the individual dequeue server 202A-C level.

As another option, the ability to reduce activity when resources in the multi-tenant on-demand database system are under duress may be provided. For example, if a database central processing unit is reaching unwanted thresholds, then processing task types that put a large load on the database central processing unit may be prevented. Demerits, or anti-permits, which force a dequeue server 202A-C to purposefully remove a task type from appearing in its listen list may be utilized. These demerits may be acquired (and removed) in a manner similar to booster permits.

As an option, there may be a set number of dequeue servers 202A-C allowed at a single point in time. However, a further function of the master process 206A-C may be adding more dequeue servers 202A-C when a number of released but unacquired permits exceeds a predetermined time threshold. For example, under heavy load for a given task type on a particular node, it is possible that all dequeue servers 202A-C will own a booster permit and thus a surplus of unclaimed booster permits may start to build up. The master process 206A-C may detect this problem by examining the age of a released but unacquired booster permit, and when the number of unclaimed booster permits above an age threshold is reached the master process 206A-C may trigger another application server 210A-C to be registered as a dequeue server 202A-C. Furthermore, when the master process 206A-C notices that the amount of released but unacquired booster permits exceeding the age threshold has reduced, it can then decide to start deregistering dequeue servers 202A-C (e.g. eventually placing the number of dequeue servers 202A-C back to the set number).

Once the request from the master process 206A-C is made to bring up a new dequeue server, an available application server 210A-C may make the decision to be registered as a dequeue server 202A-C by checking local (e.g. central processing unit) and remote (e.g. database central processing unit) utilization data. Hence, it may be possible that the master process 206A-C requests multiple extra dequeue servers 202A-C.

In other optional embodiments, a specific task/node booster permit may be manually removed, a manual booster permit may be provided which may be acquired for a finite period of time, a specific task/node booster permit may be prevented from being able to be produced, and/or all booster permits may be removed simultaneously and production of any more may be blocked for some period of time which is manually determined.

As a further option, the booster permit functionality described above may be applied on a tenant-by-tenant basis (e.g. to prevent as tasks of a single tenant of the multi-tenant on-demand database system from monopolizing resources of the multi-tenant on-demand database system). Thus, a situation where a single tenant is monopolizing resources of the multi-tenant on-demand database system may be detected and the dynamic addition of dequeue servers via the booster permit process described above may be enabled. In extreme cases of flooding where it cannot be determined if the task queue is flooded with single tenant's tasks or if there were stuck tasks from other tenants behind them, the offending jobs may be place to the back of the queue and proceed with a next batch. With respect to task types for which the above described booster permit process is utilized, the system 200 may obtain a row in a dequeue process table for the duration of task processing.

Figure 3:
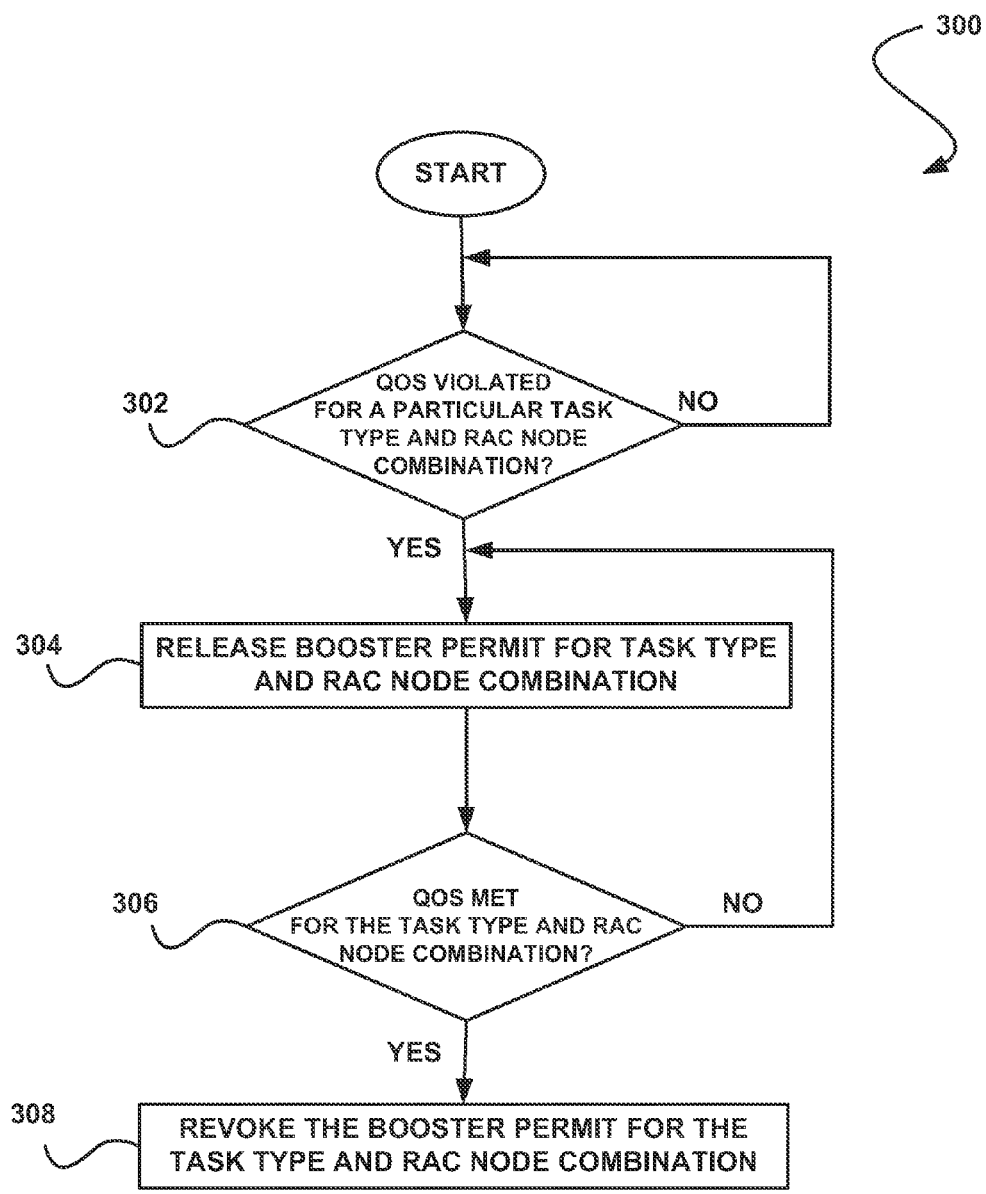
FIG. 3 illustrates a method for releasing and revoking permits to add a server for use in processing tasks, in accordance with another embodiment.

FIG. 3 illustrates a method 300 for releasing and revoking permits to add a server for use in processing tasks, in accordance with another embodiment. As an option, the method 300 may be carried out in the context of the architecture and environment of FIGS. 1-2. For example, the method 300 may be carried out utilizing one of the master processes 206A-C in the system 200 of FIG. 2. Of course, however, the method 300 may be carried out in any desired environment.

As shown in decision 302, it is determined whether a QOS policy is violated for a particular task type and RAC node combination. For example, the QOS policy may be specific to the task type, such that it may be determined whether tasks of the task type that are associated with the RAC node are being processed by an existing set of servers in a manner that is compliant with the QOS policy. If it is determined that the QOS policy is not being violated, the method 300 continues to wait for a determination that a QOS policy for a particular task type and RAC node combination is being violated. For example, the method 300 may determine, for each task type/RAC node combination whether the QOS associated with the task type is being violated.

Once it is determined that a QOS policy for a particular task type and RAC node combination is being violated, a booster permit is released for the task type and RAC node combination. Note operation 304. Such booster permit may be utilized for adding an additional server to the set of servers for processing tasks associated with the RAC node which are of the task type. In this way, a permit to add the additional server may be released (e.g. to a table of released permits), in response to a determination that the QOS policy has been violated.

Further, it is determined in decision 306 whether the QOS policy is met for the task type and RAC node combination. Thus, it may again be determined whether tasks of the task type that are associated with the RAC node are being processed in a manner that is compliant with the QOS policy. Such determination may be based on the release of the booster permit (in operation 304), such that the determination may indicate whether the released booster permit provided sufficient additional processing resources to allow the QOS policy to be met.

If it is determined in decision 306 that the QOS is not met for the task type and RAC node combination, another booster permit is released for the task type and RAC node combination (operation 304). Accordingly, multiple booster permits may be released for a single task type/RAC node combination, as needed. For example, an amount of booster permits for the task type/RAC node combination which is necessary to result in the QOS policy being met may be released.

Once it is determined that the QOS for the task type and RAC node combination is met, the released booster permit(s) for the task type and RAC node combination is revoked. Note operation 308. For example, after an additional server is added to the set of servers via acquisition of the released booster permit, the additional server may be removed from the set of servers in response to a determination that the QOS policy is no longer being violated. Thus, any additional processing power provided via acquisition of the booster permits (as described below with reference to FIG. 4) may be terminated with respect to processing tasks associated with the RAC node that are of the task type.

Figure 4:
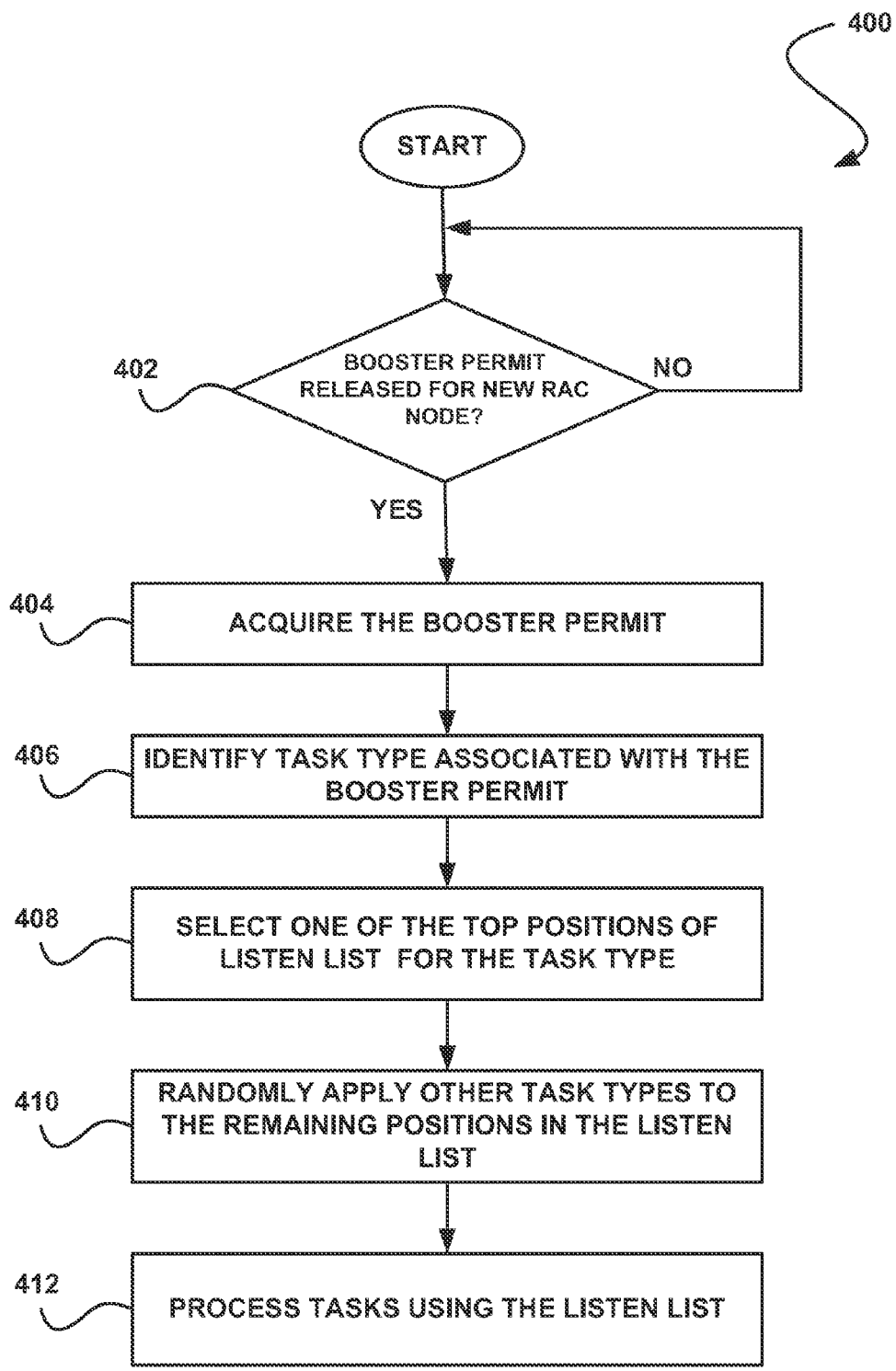
FIG. 4 illustrates a method for acquiring a permit to add a server for processing tasks, in accordance with another embodiment.

FIG. 4 illustrates a method 400 for acquiring a permit to add a server for processing tasks, in accordance with another embodiment. As an option, the method 400 may be carried out in the context of the architecture and environment of FIGS. 1-3. For example, the method 400 may be carried out utilizing one of the application servers 410A-C in the system 200 of FIG. 2. Of course, however, the method 400 may be carried out in any desired environment.

As shown in decision 402, it is determined whether a booster permit for a new RAC node has been released. With respect to the present embodiment, the new RAC node includes any RAC node for which an application server performing the present method 400 does not currently hold a booster permit. In one embodiment, the determination may be made by reading a booster permit table storing released booster permits which have not yet been acquired by application servers, such that if a booster permit is identified in the booster permit table, it may be determined that a booster permit for a new RAC node has been released.

If it is determined that a booster permit for a new RAC node has not been released, the method 400 continues to wait for a booster permit to be released. However, once it is determined that a booster permit for a new RAC node has been released, the booster permit is acquired. Note operation 404. For example, the booster permit may be acquired by removing the booster permit from the booster permit table. By acquiring the booster permit, the application server acquiring the booster permit may be an additional server that is added to a set of servers already registered for processing tasks.

Additionally, a task type associated with the booster permit is identified, as shown in operation 406. In the present embodiment, the booster permit may be specific to a task type and the aforementioned RAC node, for use providing additional processing power to tasks associated with the RAC node that are of the task type. To this end, the task type to which the booster permit is specific associated may be indicated by the booster permit.

Furthermore, as shown in operation 408, one of the top positions of a listen list is selected for the task type. In one embodiment, a listen list utilized for dequeuing tasks from a task queue may be created such that the dequeued tasks can be processed. Each position in the listen list may be associated with a different task type, and tasks may be dequeued from the task queue according to their type based on the priority as specified by the ordering in the listen list.

Thus, in the present embodiment the top position or one of the top three positions (for example) may be selected for the task type. Still yet, other tasks types are randomly applied to the remaining positions in the listen list. Note operation 410. Still yet, tasks are processed using the listen list, as shown in operation 412. For example, the tasks may be processed from the task queue as described above.

As an option, the task may be processed based on utilization of resources (e.g. resource of the additional server and resources remote to the additional server). For example, the task may optionally only be processed in response to a determination that the utilization of the resources is below a threshold (e.g. the utilization of resources of the additional server is below a first predetermined threshold and the utilization of the resources remote to the additional server is below a second predetermined threshold). In various embodiments, the resources (e.g. of the additional server) may include memory and (e.g. the resources remote to the additional server) may include a central processing unit of a database that provides the task queue.

System Overview

Figure 5:
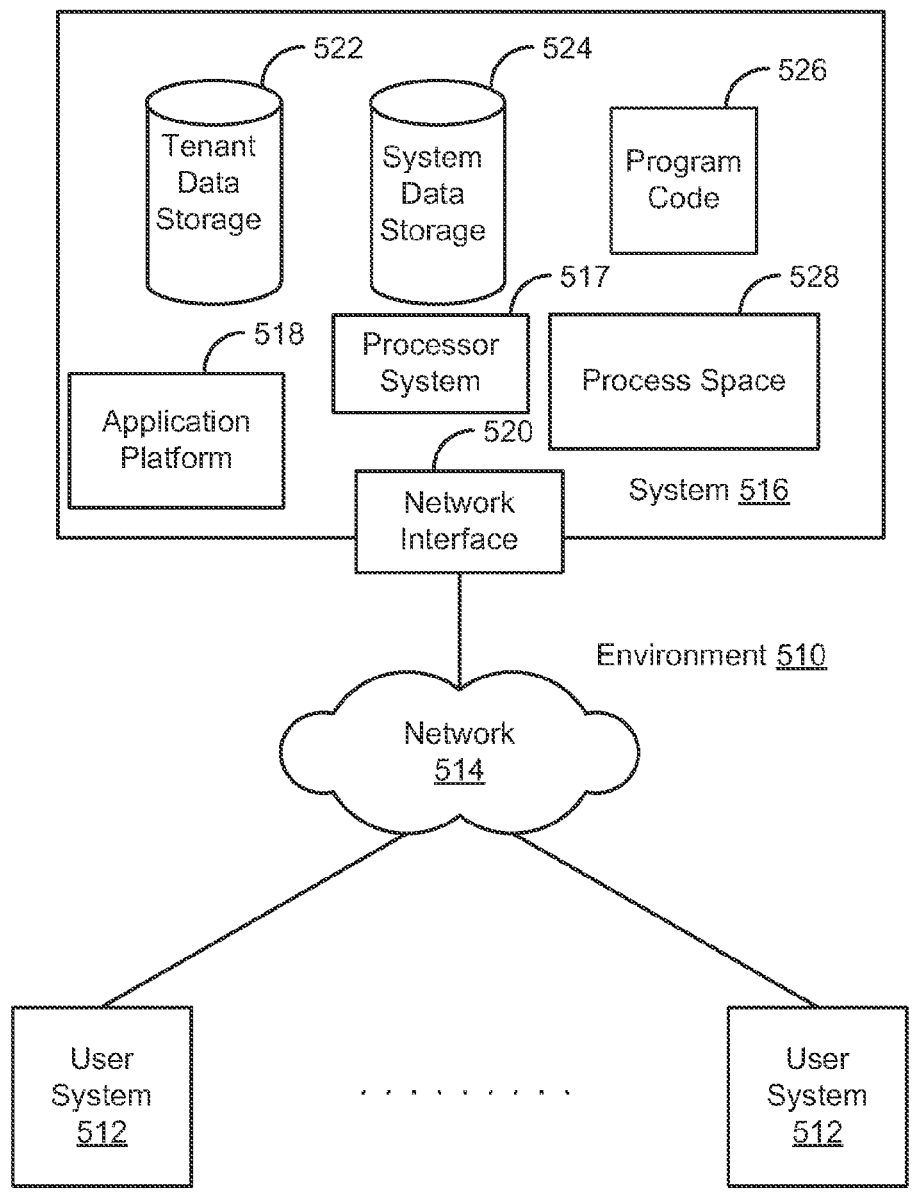
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
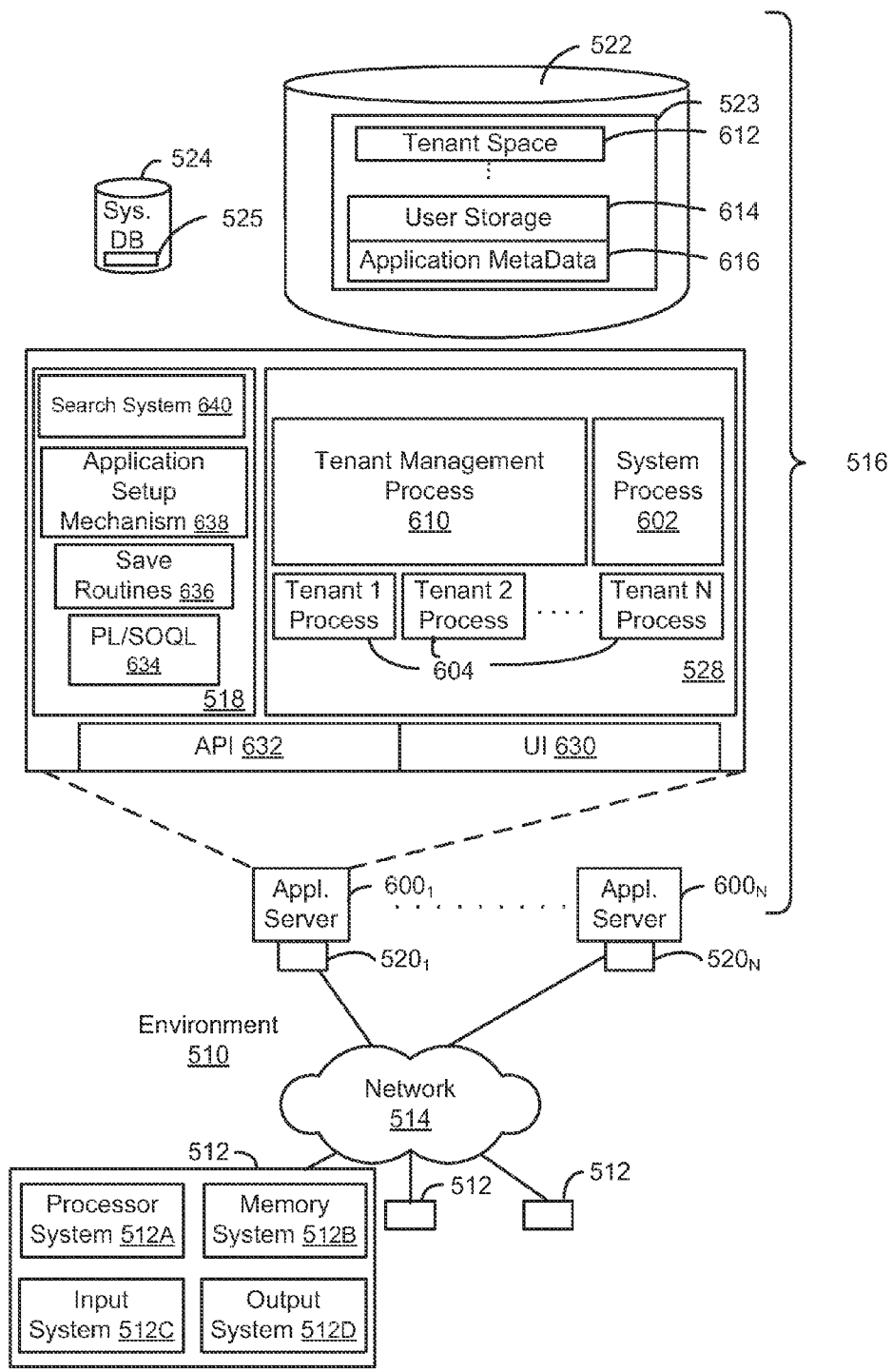
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer-readable medium including computer code which, when executed by a processor, performs a method comprising:

identifying, at a first server of a plurality of servers, an unprocessed task in a queue of a system, the unprocessed task stored in the queue for processing, wherein each of the servers is configured to dequeue unprocessed tasks from the queue in accordance with a respective listener list identifying one or more types of tasks the server is allowed to process;

determining at the first server whether a quality of service policy associated with processing the unprocessed task has been violated;

releasing a permit which specifies at least the type of the unprocessed task and storing the permit in a permit table in response to a determination that the quality of service policy associated with processing the unprocessed task has been violated, wherein each of the servers periodically examines the permit table and may determine to claim one or more of the permits stored therein based on one or more conditions, and wherein claiming a permit comprises adding the type of task specified in the claimed permit to the listener list of the server claiming the permit;

identifying an age associated with the permit stored in the permit table;

determining whether the age associated with the permit exceeds an age threshold;

incrementing a number of unclaimed permits in response to a determination that the age associated with the permit exceeds the age threshold;

determining whether the number of unclaimed permits exceeds a predetermined number; and triggering registration of a second server to the plurality of servers in response to a determination that the number of unclaimed permits exceeds the predetermined number.

2. The computer program product of claim 1, wherein the queue includes a table and the computer program product is operable such that the unprocessed task is stored in a row of the table such that the unprocessed task is identified by reading a row of the table.

3. The computer program product of claim 1, wherein identifying the unprocessed task includes identifying a type of the unprocessed task.

4. The computer program product of claim 3, wherein the computer program product is operable such that the quality of service policy is predetermined for the type of the unprocessed task.

5. The computer program product of claim 1, wherein the quality of service policy indicates an amount of time, upon storage in the queue, in which the unprocessed task is to be processed.

6. The computer program product of claim 5, wherein the computer program product is operable such that it is determined that the quality of service policy has been violated in response to a determination that the unprocessed task has been stored in the queue for more than the amount of time indicated by the quality of service policy.

7. The computer program product of claim 5, wherein the computer program product is operable such that it is determined that the quality of service policy has not been violated in response to a determination that the unprocessed task has been stored in the queue for less than the amount of time indicated by the quality of service policy.

8. The computer program product of claim 1, wherein registering the second server includes adding the type of the unprocessed task to the listener list of the second server.

9. The computer program product of claim 1, wherein the computer program product is operable such that after the second server is registered, the second server is unregistered from the plurality of servers in response to a determination that the number of unclaimed permits no longer exceeds the predetermined number.

10. The computer program product of claim 1, wherein triggering registration of the second server comprises a master process requesting that an additional server be added to the plurality of servers.

11. The computer program product of claim 1, wherein a server determining to claim a permit from the permit table comprises determining that the server has sufficient resources to act on the permit.

12. The computer program product of claim 1, wherein the computer program product is operable such that upon registration of the second server, the second server creates a listen list which includes at least the type of the unprocessed task.

13. The computer program product of claim 1, wherein the computer program product is operable such that each of the servers process unprocessed tasks from the queue based on utilization of resources of the server and utilization of resources remote to the server.

14. The computer program product of claim 13, wherein the computer program product is operable such that a server of the plurality of servers processes the unprocessed task in response to a determination that the utilization of the resources of the server is below a first predetermined threshold and the utilization of the resources remote to the server is below a second predetermined threshold.

15. The computer program product of claim 13, wherein the resources of the server include memory of the server and the resources remote to the server include a central processing unit of a database that provides the queue.

16. The computer program product of claim 1, wherein releasing the permit further comprise:
   determining whether necessary service resources are available by comparing a current resource availability against a utilization behavior of the type of the unprocessed task; and
   releasing the permit to be stored in the permit table in response to the determination that the quality of service policy associated with processing the unprocessed task has been violated and a determination that the necessary service resources are available.

17. The computer program product of claim 1, wherein the permit further includes an identification of a clustered database node associated with the unprocessed task.

18. A method comprising:
   identifying, at a first server of a plurality of servers, an unprocessed task in a queue of a system, the unprocessed task stored in the queue for processing, wherein each of the servers is configured to dequeue unprocessed tasks from the queue in accordance with a respective listener list identifying one or more types of tasks the server is allowed to process;
   determining at the first server whether a quality of service policy associated with processing the unprocessed task has been violated;
   releasing a permit which specifies at least the type of the unprocessed task and storing the permit in a permit table in response to a determination that the quality of service policy associated with processing the unprocessed task has been violated, wherein each of the servers periodically examines the permit table and may determine to claim one or more of the permits stored therein based on one or more conditions, and wherein claiming a permit comprises adding the type of task specified in the claimed permit to the listener list of the server claiming the permit;
   identifying an age associated with the permit stored in the permit table;
   determining whether the age associated with the permit exceeds an age threshold;
   incrementing a number of unclaimed permits in response to a determination that the age associated with the permit exceeds the age threshold;
   determining whether the number of unclaimed permits exceeds a predetermined number; and
   triggering registration of a second server to the plurality of servers in response to a determination that the number of unclaimed permits exceeds the predetermined number.

19. An apparatus, comprising:
a processor; and
a memory comprising computer readable instructions which, when executed by the processor, cause the apparatus to perform a method comprising:
   identifying, at a first server of a plurality of servers, an unprocessed task in a queue of a system, the unprocessed task stored in the queue for processing, wherein each of the servers is configured to dequeue unprocessed tasks from the queue in accordance with a respective listener list identifying one or more types of tasks the server is allowed to process;
   determining at the first server whether a quality of service policy associated with processing the unprocessed task has been violated;
   releasing a permit which specifies at least the type of the unprocessed task and storing the permit in a permit table in response to a determination that the quality of service policy associated with processing the unprocessed task has been violated, wherein each of the servers periodically examines the permit table and may determine to claim one or more of the permits stored therein based on one or more conditions, and wherein claiming a permit comprises adding the type of task specified in the claimed permit to the listener list of the server claiming the permit;
   identifying an age associated with the permit stored in the permit table;
   determining whether the age associated with the permit exceeds an age threshold;
   incrementing a number of unclaimed permits in response to a determination that the age associated with the permit exceeds the age threshold;
   determining whether the number of unclaimed permits exceeds a predetermined number; and
   triggering registration of a second server to the plurality of servers in response to a determination that the number of unclaimed permits exceeds the predetermined number.

* * * * *